(12) United States Patent
Sandlin

(10) Patent No.: US 7,333,044 B1
(45) Date of Patent: Feb. 19, 2008

(54) ROCKET-POWERED SENSOR TARGET ASSEMBLY

(75) Inventor: Destin W. Sandlin, Decatur, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 17 days.

(21) Appl. No.: 11/534,834

(22) Filed: Sep. 25, 2006

(51) Int. Cl.
*G01S 7/40* (2006.01)
*H01Q 15/00* (2006.01)
*G01S 13/00* (2006.01)

(52) U.S. Cl. .............................. 342/5; 342/7; 342/165; 342/173; 342/174; 244/3.1; 244/3.11; 244/3.12

(58) Field of Classification Search ........ 244/3.1–3.12; 342/5–12, 165–175; 102/335, 347–352; 60/253–256
See application file for complete search history.

(56) References Cited

U.S. PATENT DOCUMENTS

| | | | | |
|---|---|---|---|---|
| 2,957,417 A * | 10/1960 | Musgrave | ...................... | 342/9 |
| 3,339,201 A * | 8/1967 | Fischer et al. | .................. | 342/9 |
| 3,413,636 A * | 11/1968 | Migdal | ......................... | 342/11 |
| 3,568,191 A * | 3/1971 | Hiester et al. | .................. | 342/8 |
| 3,866,226 A * | 2/1975 | Benneche et al. | ............. | 342/9 |
| 4,003,659 A * | 1/1977 | Conard et al. | ............. | 244/3.11 |
| 5,147,088 A * | 9/1992 | Smith et al. | ............... | 244/3.11 |
| 5,212,946 A | 5/1993 | Hans et al. | | |
| 5,259,567 A * | 11/1993 | Jano et al. | .................. | 244/3.11 |
| 5,372,334 A * | 12/1994 | Cuadros | ..................... | 244/3.11 |
| 6,833,804 B2 * | 12/2004 | Atar | ............................. | 342/10 |
| 2004/0227657 A1 * | 11/2004 | Atar | ............................. | 342/10 |

* cited by examiner

*Primary Examiner*—Bernarr E. Gregory
(74) *Attorney, Agent, or Firm*—Michael K. Gray

(57) ABSTRACT

A rocket tube for housing a reloadable rocket motor is connected to a spacer element and a wire-rider element. A sensor target for reflecting radar signals is screwably attached to the rocket tube. The sensor target is provided with a plug for effectively sealing one end of the rocket tube with the other end of the rocket tube being utilized to reload a rocket motor upon completion of a test firing. A guide wire is threaded through the wire-rider element with the guide wire serving as a travel path. The rocket tube, spacer element, and wire-rider element are connected in an easily assembled, aerodynamic manner that allows for multiple radar tests using the same components within a brief time period.

20 Claims, 3 Drawing Sheets

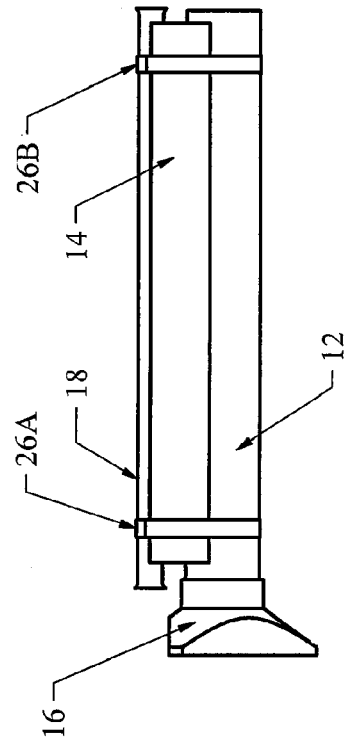
FIG. 11
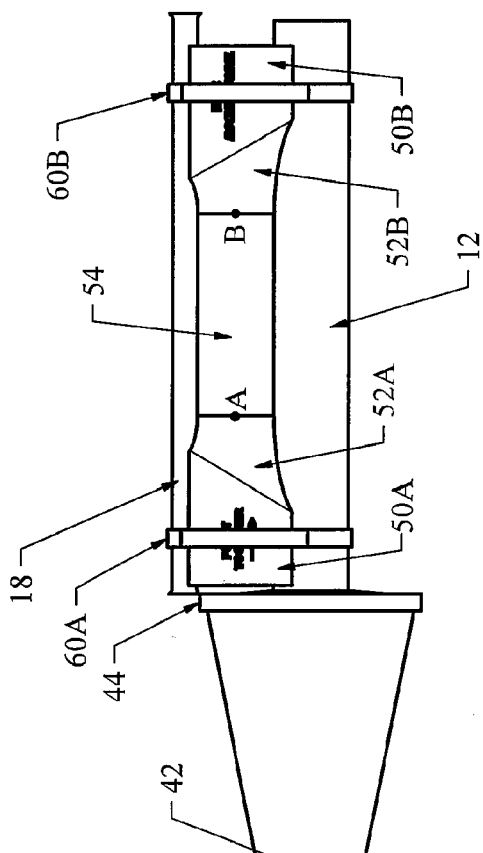
FIG. 9
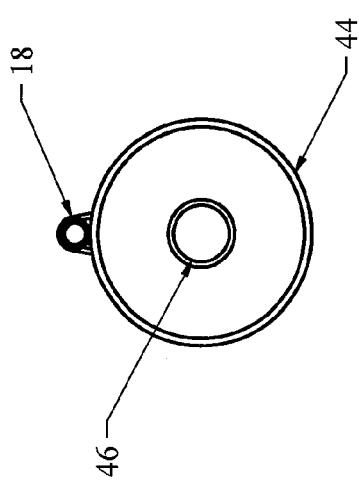
FIG. 8
FIG. 10

ROCKET-POWERED SENSOR TARGET ASSEMBLY

The invention described herein may be manufactured, used and licensed by or for the U.S. Government for governmental purposes without payment of any royalties thereon.

BACKGROUND OF THE INVENTION

I. Field of the Invention

The present invention relates to the field of radar reflector devices for radar testing. More particularly, the present invention pertains to a wire-guided, reusable, low cost, variable velocity, low mass rocket assembly for use in ground truthing tests for radar tracking and ranging systems II. Discussion of the Background An often used prior art method of radar testing requires the simultaneous use of multiple rocket motors mounted concentrically around a guide wire which necessitated the fabrication and use of elaborate wire riders. Very lengthy reload times were experienced with these heavy and relatively complicated prior art systems. Further, the prior art rocket models were difficult to stop on a guide cable. The significant weight or mass of these prior art models resulted in relatively high amounts of kinetic energy being realized at peak velocities which necessitated the construction of elaborate bungie-type stop mechanisms. Still further, the quantity of parts required for prior art systems resulted in significant material costs.

Thus, a clear need was present for a low-cost, time efficient, high velocity high-radar return rocket powered sensor target assembly.

SUMMARY OF THE INVENTION

Accordingly, one object of the present invention is to provide a low cost, re-usable rocket-powered, sensor target assembly.

Yet another object of the present invention is to realize a rocket-powered, sensor target assembly having a high radar return.

These and other valuable objects are realized by a radar sensor target assembly that includes a rocket tube, a spacer element, and a wire-rider element that are connected together. A sensor target is connected to the rocket tube. A guide wire is inserted through the wire-rider element to provide a travel path for the radar sensor target assembly. The assembly is propelled along the guide wire by a reloadable rocket motor that is easily inserted into the rocket tube.

The sensor target has a base plug region for sealing an end of said rocket tube. The base plug region is connecting to a threaded portion of the sensor target, the threaded portion allowing the sensor target to be screwably secured to the rocket tube. The plug region and threaded portion of the sensor target are integrally connected.

The present invention allows many radar tests to be conducted over a short period of time. Further, the present invention may be utilized in acoustic tests, infrared tests and other type tests where waves of a specific wave-length are reflected off the sensor element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a frontal view of the target sensor element and wire rider tube according to the embodiment of FIG. 5.

FIG. 9 is a side view of the embodiment of the invention of FIG. 5.

FIG. 10 is a frontal view of the corner reflector sensor and wire rider tube used in the embodiment of the invention in FIG. 1.

FIG. 11 is a side-view of the embodiment of the invention of FIG. 1.

DETAILED DESCRIPTION

Figure 1:
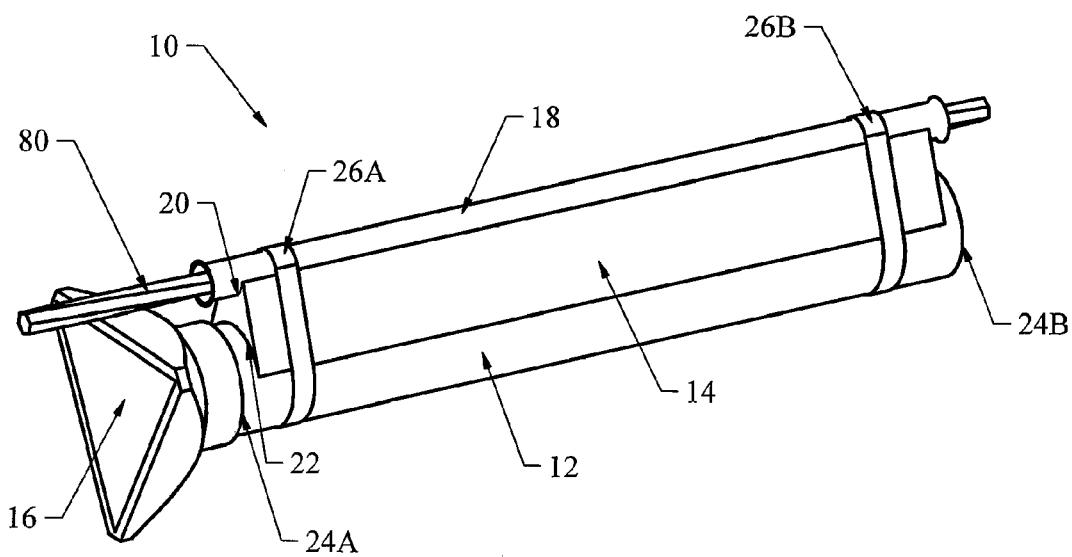
FIG. 1 is a perspective view of the rocket-powered, sensor target assembly according to the present invention.

With reference to FIG. 1, a rocket-powered, sensor target assembly 10 according to the present invention has a rocket tube 12 for accommodating a reloadable rocket motor such as the type disclosed in U.S. Pat. No. 5,212,946 to Hans et al. which issued on May 25, 1993 for a "Reloadable/Modular Solid Propellant Rocket Motor" and which is herein incorporated by reference.

In the prototype of the present invention, the rocket tube used was a one-inch diameter aluminum tube having a length of approximately eight and one-half inches. The opening 24A at the front of the tube is bordered by an inner threaded circumferential portion on the inside wall of the tube (not shown) which allows the tube 12 to be securely and screwably attached to the sensor target 16. The rear opening 24B provides access to the interior of tube 12 so as to provide for the easy reloading of a propellant rocket motor.

A spacer element 14 lies over tube 12 and extends over the tube's length. Spacer element 14 has a prism-type shape except that an arc-shaped surface 20 extends along its top and an arc-shaped surface 22 extends along its bottom. Arc-shaped surface 20 accommodates a wire-rider tube 18 and arc-shaped surface 22 allows for flush contact with an outer circumferential region of the rocket tube 12. In the prototype of the present invention spacer 14 was made of molded plastic and the wire-rider tube 18 was a ¼ inch copper tube.

The rocket tube 12, the spacer 14 and the wire-rider tube 18 are secured to each other by tubing spacer clamps 26A, 26B. Alternatively, the rocket tube 12, spacer 14 and wire-rider tube 18 could be glued, epoxied, or welded together or molded as an integral unit. (The wire-rider tube could be replaced with rings or eyelets connecting to a spacer element. The eyelets can be provided with a spring-loaded quick attachment/detachment mechanism similar to the locking/securing mechanisms used in a jewelry necklace, i.e., a clasp securing mechanism. Also, the spacer can be a two-pieced hinged element that is opened and closed by locking and unlocking a hinged cap by a hasp with the guide wire being positioned between the two pieces of the spacer; thus the spacer would include a wire-riding means.)

Figure 2:
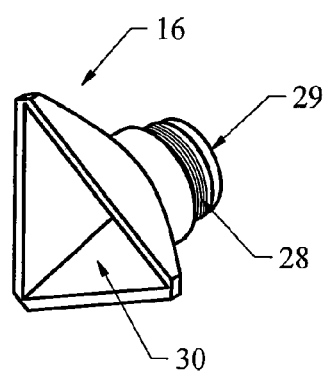
FIG. 2 is a perspective view of a corner reflector sensor as used with the assembly of FIG. 1.
Figure 3:
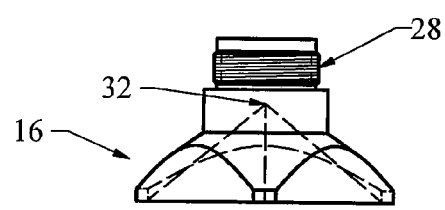
FIG. 3 is a side view of the corner reflector sensor as used with the assembly of FIG. 1.
Figure 4:
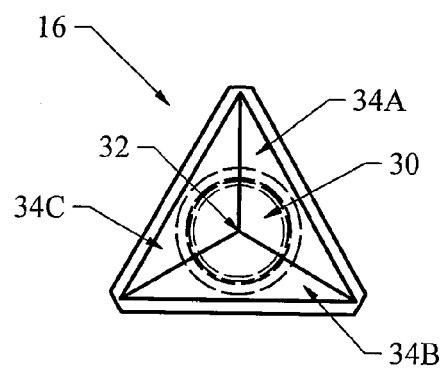
FIG. 4 is a frontal or top view of the corner reflector sensor as used with the assembly of FIG. 1.

With reference to FIGS. 2, 3 and 4, the sensor target 16 is a corner-reflector type sensor target. The well 30 of the sensor target has a bottom 32 or vertex that may be viewed as the connecting point of three isosceles triangle-shaped surfaces 34A, 34B, 34C. A threaded portion 28 of the target sensor 16 allows a secure connection to the rocket tube 12 and a plug portion 29 at the base of the sensor target serves as a forward plug seal that restricts out-gassing and encourages proper burning of the rocket motor propellant.

The rider tube 18 allows the rocket-powered, sensor target assembly 10 to be propelled along the path of a guide wire 80 which is inserted through the rider tube 18.

When the sensor target 16 is used with a reloadable solid propellant rocket motor such as disclosed in the aforementioned U.S. Pat. No. 5,212,946, the forward plug assembly elements are simply removed from the cylindrical housing or rocket tube and replaced with the sensor target 16. (In U.S. Pat. No. 5,212,946, the forward plug assembly elements are those elements which lie above O-ring 37 in FIG. 3 thereof).

Figure 5:
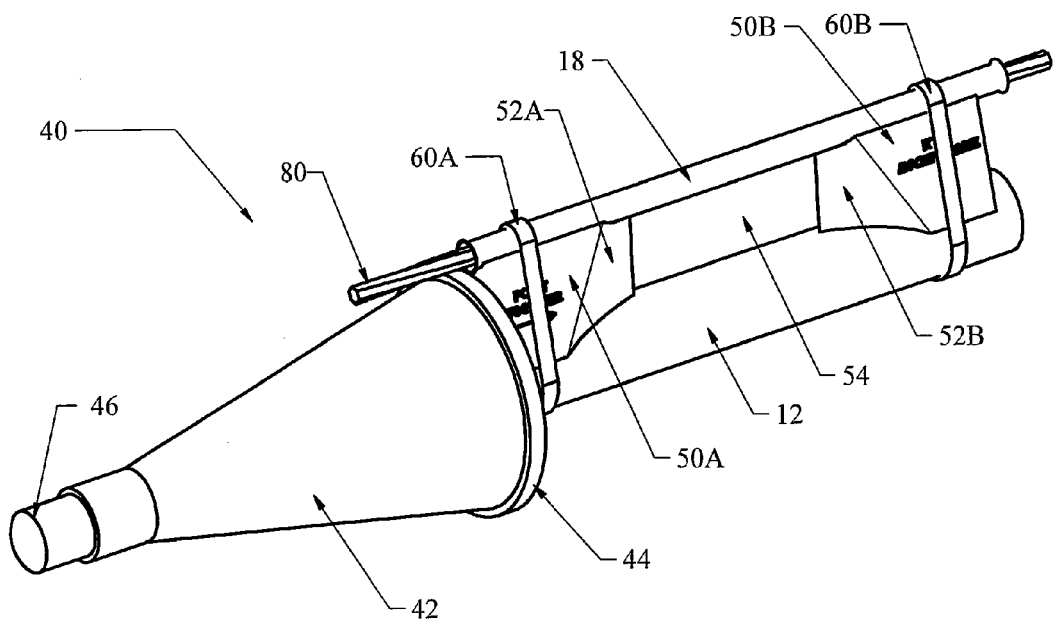
FIG. 5 is a perspective view of a rocket-powered, sensor target assembly according to another embodiment of the present invention.
Figures 6, 7:
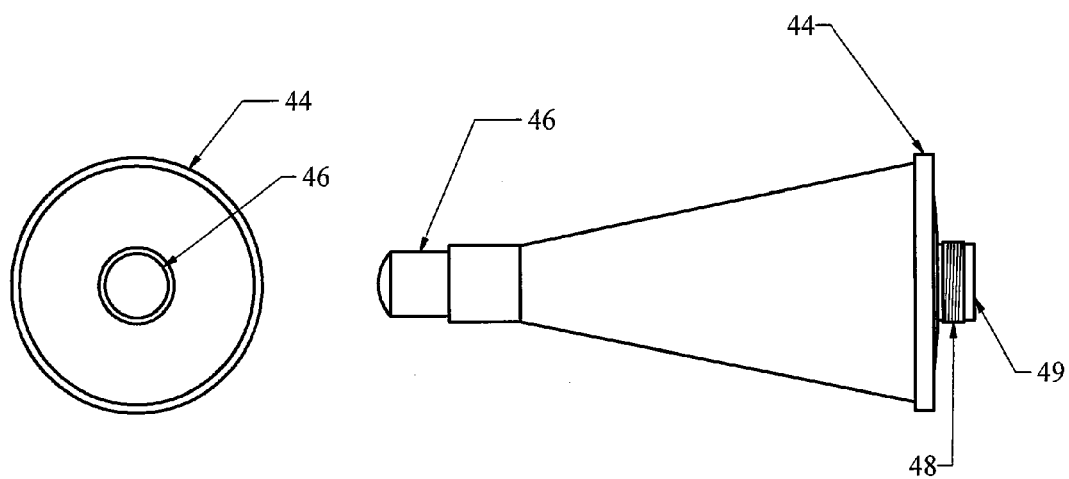
FIG. 6 is a frontal view of the target sensor element according to the embodiment of FIG. 5.
FIG. 7 is a side view of the target sensor element according to the embodiment of FIG. 5.

In FIGS. 5 and 9, the rocket-powered, sensor target assembly 40 according to another embodiment of the invention has a rocket tube 12 that is secured to offset spacers 50A and 50B and to wire-rider tube 18 by clamps 60A and 60B. Offset spacer 50A has a tapered region 52A that extends laterally inward from opposing sides of offset spacer 50A. Point A can be viewed as extending on a line formed by the opposing tapered sides of offset spacer 50A which line is normal to a centerline that extends through the entire length of rocket tube 12.

In a like manner, offset spacer 50B has a tapered region 52B that extends laterally inward from opposing sides of offset spacer 50B. Point B can be viewed as extending on a line formed by the opposing tapered sides of offset spacer 50B which line is normal to a centerline that extends through the entire length of rocket tube 12.

A line drawn through points A and B would be parallel to a centerline extending through the rocket tube 12. The top and bottom of offset spacer 50A and the top and bottom of offset spacer 50B are formed to accommodate the wire-rider tube 18 and the rocket tube 12, respectively. An open space 54 is formed between the offset spacers 50A, 50B and the rocket tube 12 and the wire-rider tube 18.

Still with reference to FIGS. 5 and 9, the sensor target 42 is in the shape of a rocket propelled grenade (RPG) so that radar testing can be performed on an object having the actual shape and velocity of an RPG.

In a similar fashion, sensor targets could be molded to conform to any number of desired shapes, etc. The target sensor 42 is made of aluminum and has a nose section 46 that is positioned in front of a conical section that is attached to an end plate region 44. End plate region 44 is attached to threaded portion 48 and plug portion 49. Like the sensor reflector target 16, the sensor target 42 is threadably attached to the rocket tube 12.

With reference to FIGS. 8 and 9, the frontal view of the rocket-powered sensor target assembly 40 demonstrates that the wire-rider tube 18 is positioned just above and behind the top of the end plate region of the sensor target 42. This positioning ensures that a guide wire inserted into the wire-rider tube will not contact or be impeded by other elements of the assembly. This positioning in conjunction with the lightweight, and aerodynamic design of the rocket-powered sensor target assembly provides for improved acceleration capability and velocity over the prior art.

Likewise, with reference to FIGS. 10 and 11, the wire-rider tube is positioned just above and behind the sensor target 16 so as to ensure that a guide wire inserted into the wire-rider tube 18 will not contact or by impeded by other elements of the rocket-powered, sensor target assembly 10.

In a preferred operation of the assembly, wire-rider tubes 18 would be threaded to guide wire cables of sufficient length for the rocket assembly to come to a stop after burnout while still on the guide wire. When the wire-rider tube is on the guide-wire, the remaining elements of the rocket-powered, sensor target assembly are assembled to the wire-rider tube.

The rocket is armed by inserting an electric ignition match into the motor assembly. The operator can then move a safe distance away and fire the rocket at a desired time. After motor burnout and flight, the empty motor is replaced with a replacement motor. The rocket-powered, sensor target assembly is then ready for a new test within a span of about five minutes. The hardware of the present invention is re-usable and interchangeable, with the only consumable item being the rocket motor reload.

The corner reflector sensor target threads directly into a reloadable rocket motor assembly without having to use any interfacing hardware. The corner reflector sensor target utilizes the high radar reflectivity properties of a corner cube such that the relatively small reflector area provides a large radar cross-sectional return. The velocity profile of the model can be changed by varying the load of the reloadable rocket motor. The small area of the rocket assembly of the present invention reduces drag forces and allows the model to approach speeds of Mach 1. The unique characteristics of the device allow it to be reloaded and reused in roughly five minutes. In the present invention only one reloadable rocket motor is utilized per firing; thus, both the time and cost of radar testing is reduced significantly.

The light weight of the present invention makes it possible for a copper-tube wire guide (the type available at hardware stores) to be used to guide the rocket powered sensor target assembly down a rocket path that is provided by a steel cable or guide wire.

The light weight and low inertial design of the present invention allows it to be accelerated to higher velocities while realizing shorter stopping distances. The invention allows for more testing in less time with fewer parts that require less maintenance. Accordingly, significant cost savings are achieved. Further, since the present invention is lightweight and can be easily contained on a steel cable, radar testing laboratories can conduct tests at their own facilities without need of traveling to a rocket test range.

Various modifications are possible without deviating from the spirit of the present invention. Accordingly the scope of the invention is limited only by the claim language which follows hereafter.

What is claimed is:

1. A radar sensor target assembly, comprising:
    a singular rocket tube;
    a spacer element connected to the rocket tube;
    a wire-rider tube connected to said spacer element; and
    a sensor target connected to said rocket tube.

2. A radar sensor target assembly according to claim 1, wherein:
    said sensor target device is a corner-reflector sensor target.

3. A radar sensor target assembly according to claim 2, wherein:
    said sensor target has a well region that is formed by three triangular sides with a vertex point constituting the bottom of said well region.

4. A radar sensor target assembly according to claim 1, wherein:
said sensor target is modeled to a shape of a desired configuration.

5. A radar sensor target assembly to claim 4, wherein:
said sensor target is in the shape of a rocket propelled grenade.

6. A radar sensor target assembly according to claim 1, wherein:
said sensor target has a base plug region for sealing an end of said rocket tube, said base plug region being connecting to a threaded portion of said sensor target, said threaded portion allowing said sensor target to be screwably secured to said rocket tube.

7. A radar sensor target assembly according to claim 6, further comprising:
at least one clamp for securing said rocket tube, said spacer element and said sensor target together.

8. A radar sensor target assembly according to claim 6, wherein:
said rocket tube accommodates a reloadable rocket motor.

9. A radar sensor target assembly according to claim 1, wherein:
said rocket tube accommodates a reloadable rocket motor.

10. A radar sensor target assembly according to claim 1, wherein:
a bottom portion of said spacer is contoured to accommodate a top portion of said rocket tube within the bottom portion of said spacer.

11. A radar sensor target assembly according to claim 1, wherein:
said top portion of said spacer is contoured to accommodate a bottom portion of said wire-rider tube.

12. A radar sensor target assembly according to claim 1, wherein:
said spacer element is a first offset spacer element.

13. A radar sensor target assembly according to claim 12, further comprising:
a second offset spacer element, said first and second offset spacer elements being spaced apart so as to form an open space between them.

14. A radar sensor target assembly according to claim 13, wherein:
said open space lies between said rocket tube and said wire-rider tube.

15. A radar sensor target assembly according to claim 13, wherein:
said wire-rider tube is positioned just above and behind a top portion of said sensor target to allow unimpeded travel of said assembly over a guide wire that is threaded through said wire-rider tube.

16. A radar sensor target assembly according to claim 1, wherein:
said wire-rider tube is positioned just above and behind a top portion of said sensor target to allow unimpeded travel of said assembly over a guide wire that is threaded through said wire-rider tube.

17. A radar sensor target assembly, comprising:
a rocket tube;
a spacer element connected to the rocket tube;
a wire-rider element connected to said spacer element;
a sensor target connected to said rocket tube; and wherein
a guide wire is inserted through said wire-rider element to provide a travel path for said radar sensor target assembly which is rocket propelled by a reloadable rocket motor.

18. A radar sensor target assembly according to claim 17, wherein:
said sensor target has a base plug region for sealing an end of said rocket tube.

19. A radar sensor target assembly according to claim 18, wherein:
said base plug region is connected to a threaded portion of said sensor target, said threaded portion allowing said sensor target to be screwably secured to said rocket tube.

20. A radar sensor target assembly according to claim 18, wherein:
said plug region and said threaded portion of said sensor target are integrally connected.

* * * * *